F. HOLBROOK.

BED LASTING MACHINE.

APPLICATION FILED JUNE 16, 1910.

Reissued Aug. 23, 1910.

13,147.

4 SHEETS—SHEET 1.

WITNESSES:

F. R. Roulstone

E. Batchelder

INVENTOR

Frank Holbrook;

By

Wright Brown Quinby & May

Attys.

F. HOLBROOK.

BED LASTING MACHINE.

APPLICATION FILED JUNE 16, 1910.

Reissued Aug. 23, 1910.

13,147.

4 SHEETS—SHEET 2.

WITNESSES:

F. R. Ralstone

E. Batchelder

INVENTOR:

Frank Holbrook;

By Wright Brown Quinby & May

Attys.

F. HOLBROOK.

BED LASTING MACHINE.

APPLICATION FILED JUNE 16, 1910.

Reissued Aug. 23, 1910.

13,147.

4 SHEETS—SHEET 3.

WITNESSES:

F. R. Rankstone

E. Buchholz

INVENTOR:

Frank Holbrook,

By Wright Brown Quinby & May

Attys.

F. HOLBROOK.
BED LASTING MACHINE.
APPLICATION FILED JUNE 16, 1910.
Reissued Aug. 23, 1910.
13,147.
4 SHEETS—SHEET 4.
Fig. 5.
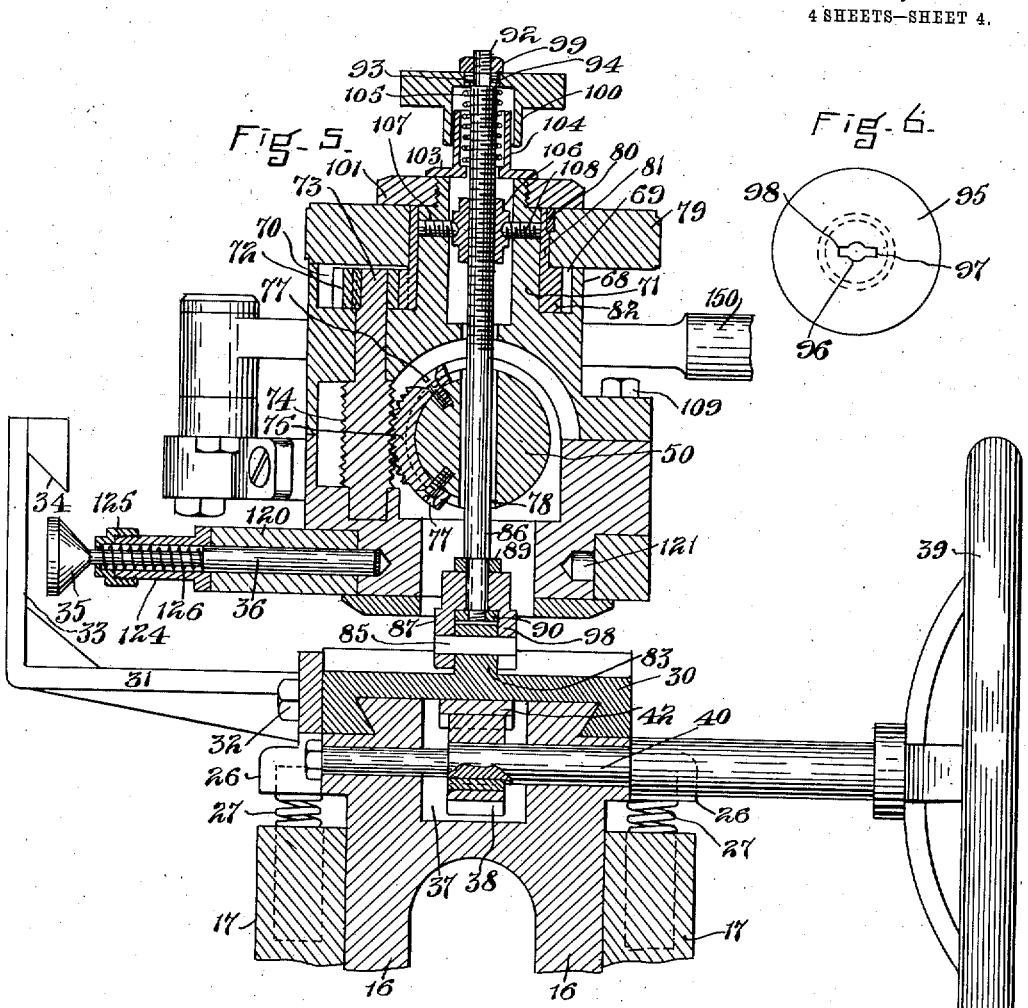
Fig. 6.
Fig. 7.
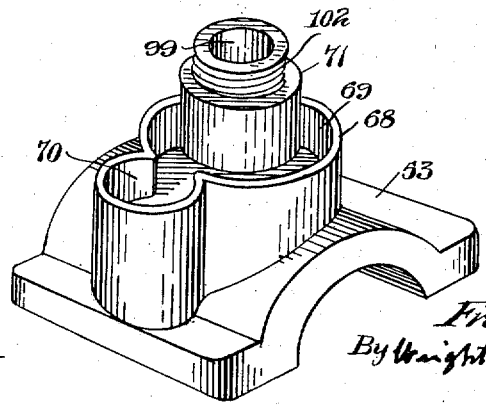
WITNESSES.
F. R. Ponlstone
E. Batchelder
INVENTOR.
Frante Holbrook;
By Wright Brown Quinby & Ely
Attys.

UNITED STATES PATENT OFFICE.

FRANK HOLBROOK, OF LYNN, MASSACHUSETTS, ASSIGNOR TO MAURICE V. BRESNAHAN, OF LYNN, MASSACHUSETTS.

BED-LASTING MACHINE.

13,147. Specification of Reissued Letters Patent. Reissued Aug. 23, 1910.

Original No. 957,883, dated May 17, 1910, Serial No. 495,332. Application for reissue filed June 16, 1910. Serial No. 567,335.

*To all whom it may concern:*

Be it known that I, FRANK HOLBROOK, of Lynn, in the county of Essex and State of Massachusetts, have invented certain new and useful Improvements in Bed-Lasting Machines, of which the following is a specification.

This invention relates to an improvement in bed lasting machines.

Figure 1:
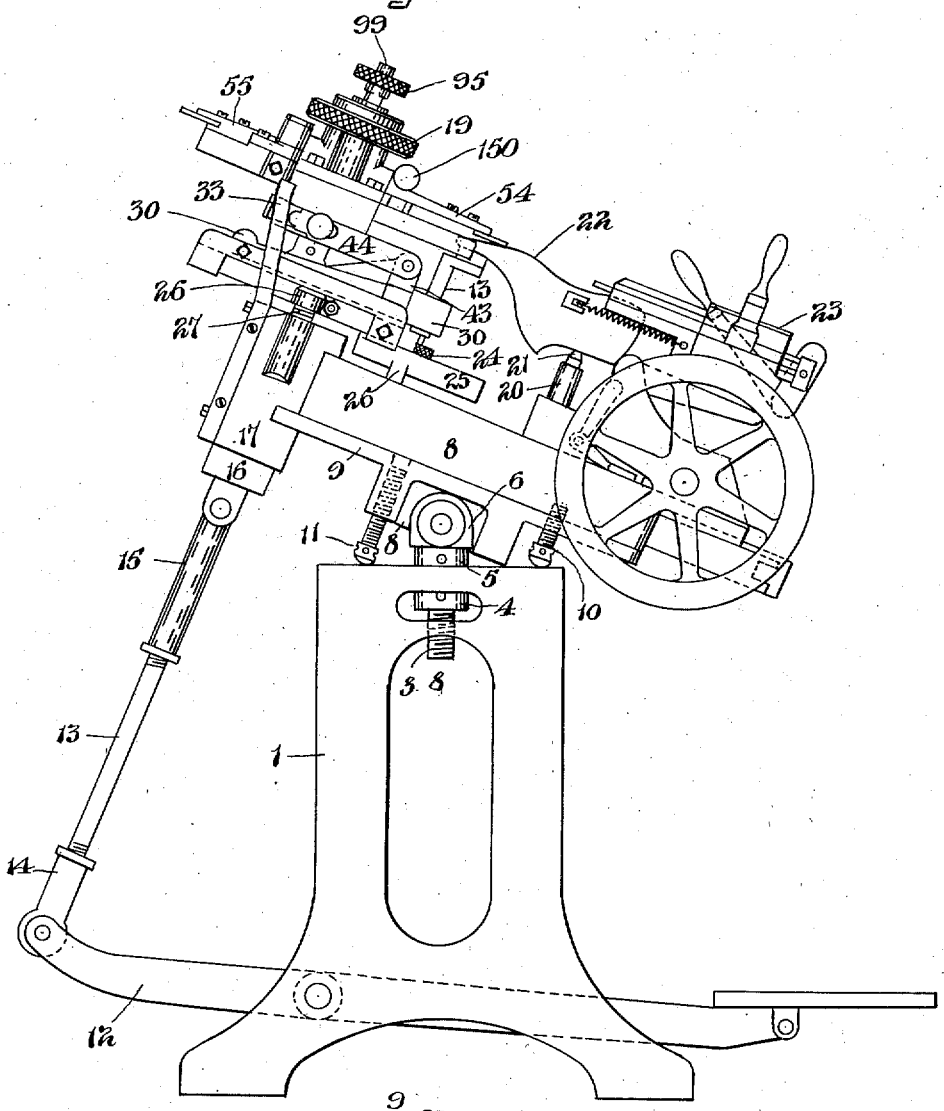
Figure 8:
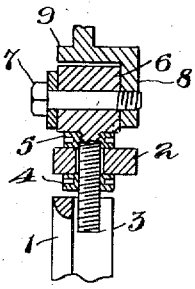
Figure 2:
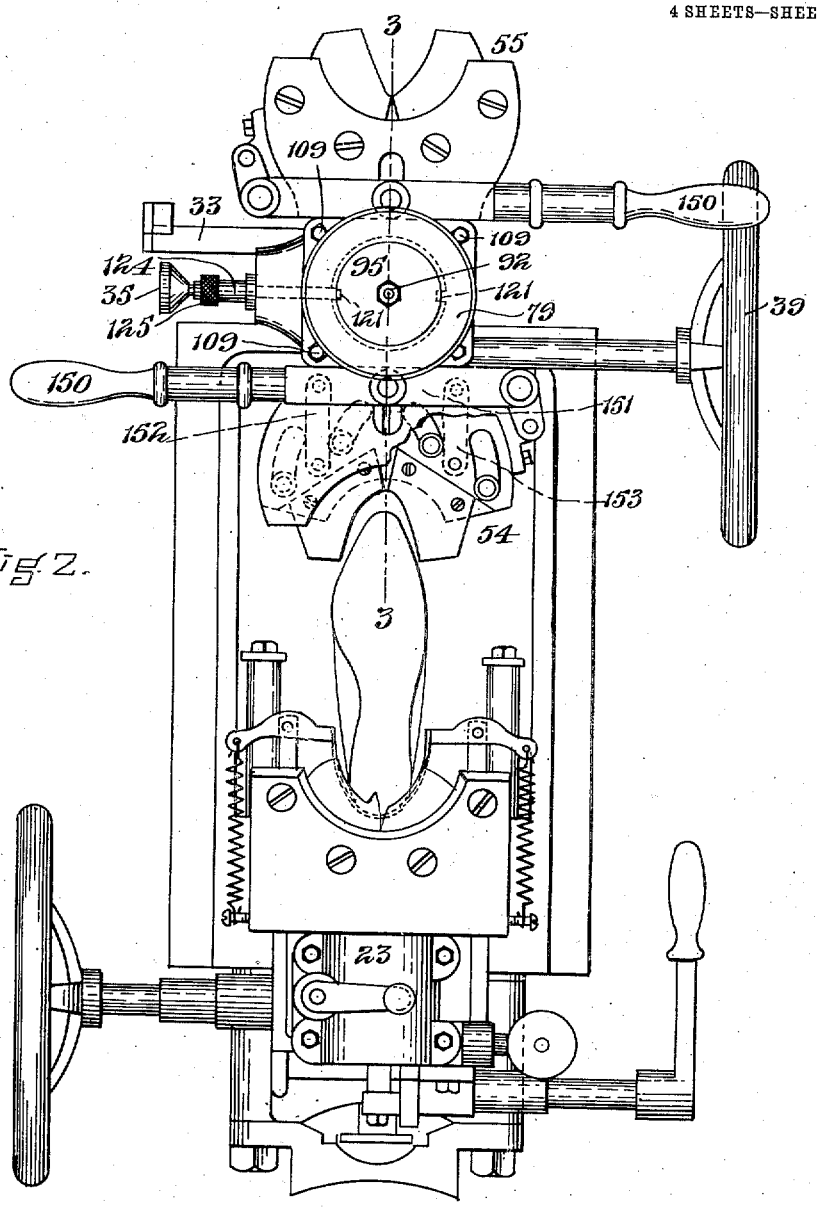
Figure 9:
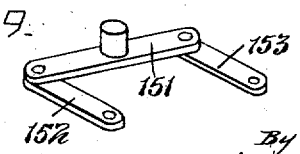
Figure 3:
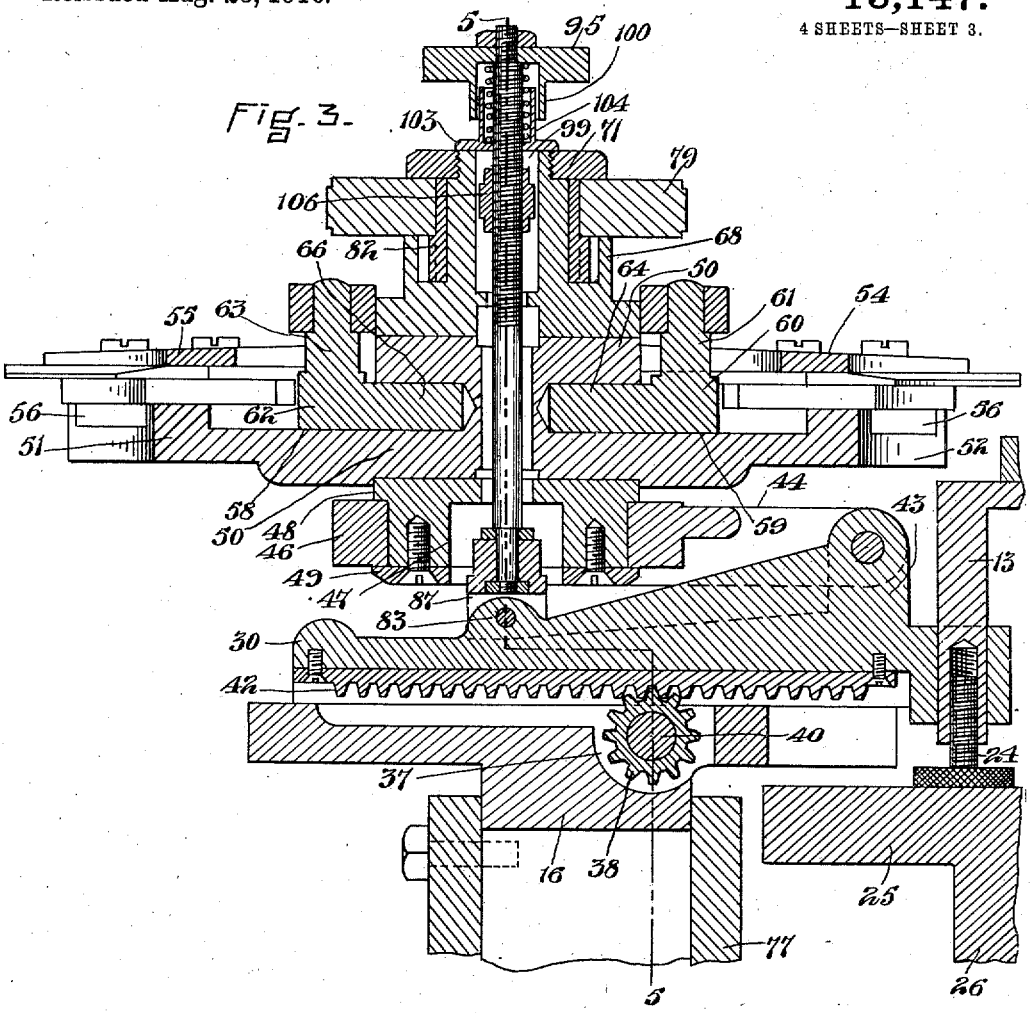
Figure 4:
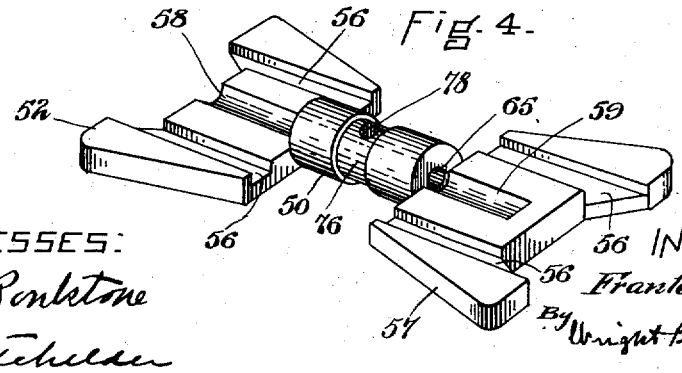

Figure 1 in side elevation, shows a machine constructed in accordance with my invention, a last being shown in position on a jack post with the heel engaged by the heel clamp, the toe of the last resting on the toe piece, this being the position that the parts assume prior to the operation of the machine for "wiping over" the toe and heel. Fig. 2 is a top plan view of the parts, as shown in Fig. 1. Fig. 3 is a vertical sectional view on line 3—3 of Fig. 2, said section showing the mechanism on the toe end of the machine; in this view appears the mechanism for advancing and receding the toe end of the machine to accommodate different sizes of shoes, the top of the view showing the "wipers" and mechanisms for tipping the same. Fig. 4 is a detail perspective view of the spider, forming a part of the toe end of the machine, and in which the toe wiper plates are arranged. Fig. 5 is a detail sectional view on the broken line 5—5 of Fig. 3, showing the means for tipping, advancing, receding and revolving the toe end of the machine. Fig. 6 is a top plan view of a hand wheel that in the completed machine is connected to a spindle, for the purpose of raising or lowering the front ends of the toe wipers. Fig. 7 is a detail perspective view of a casting or gear box, forming a part of the toe end of the machine. Fig. 8 is a sectional view on line 8—8 of Fig. 1, showing the means for attaching the bed of the machine to the framework. Fig. 9 is a detail view showing the connection between the toe wiper plates and the hand lever used for operating said plates.

In the drawings, the same reference symbols indicate the same parts in all of the figures.

Machines for lasting boots and shoes are old and very well known. Such machines are illustrated in U. S. Letters Patent No. 365,505, dated June 28, 1887. Reference may be had to said patent for a detail description of said machines. These machines as practically operated prior to my invention, have been provided at the toe end of the machine with one set only of wiper plates. In these machines when, for any reason, a different set of toe plates is desired, the toe plates on the machine have to be removed and other toe plates attached. Certain disadvantages have always resulted from this construction. Further, in said prior machines the frame of the machine has been substantially horizontal and no means have been provided for tilting the machine to assist the operator in the operation of the machine.

A lasting machine constructed in accordance with my invention involves, first, the pivoting of the bed on the framework so that said bed and its attached mechanisms may be tilted at an angle to suit the operator; second, the provision of means for adjusting the height of the bed; third, the provision of a pivoted turret or revolving head for the toe end of the machine, constructed to carry two or more sets of toe wipers, so that a whole case of shoes, rights and lefts, may be lasted without removing toe wipers, the head or turret being turned to bring left toe wipers or right toe wipers in position, according as a right or left shoe is to be lasted. While on the drawings, only two sets of toe wipers are shown on the revolving turret, any number may be employed.

Referring to the drawings which illustrate such portions of a lasting machine as is necessary to show my invention, 1 represents one end of a suitable standard, the standard at the other end of the machine being a duplicate of that shown in Fig. 1. The top of each standard 1, is formed with an inwardly projecting flange 2, (Fig. 8), each adapted to receive a bolt 3.

4 represents a nut arranged on the bolt 3, below the flange 2.

5 represents a nut arranged on the bolt 3 above the flange 2. By means of the nuts 4, 5, each bolt 3 may be raised or lowered and then clamped in position by turning each nut against the flange 2, the nuts serving to clamp the bolts rigidly to the flange 2. Each of these bolts 3, at its upper end, is formed with a perforated head 6, adapted to receive a bolt 7, arranged in a flange 8, at each side of the bed 9. These bolts 3 support the bed of the machine and enable the operator to adjust said bed to any height that he desires.

10, 11 represent set screws arranged in the bed 9, on either side of the bolts 7, at each end of the machine, and by adjusting these set screws, the bed plate can be tilted to and maintained at any desired angle.

By the above-described mechanism, the bed 9 can be raised or lowered to any desired height, and can also be set at any desired angle at said height, and then clamped in that position at said angle and height. This enables the operator to adjust the machine so that he can do all his work from the heel end of the machine and have free access to the toe on both sides without requiring the operator to walk around the machine, as in old machines, and enabling the operator to get at both sides of the toe with equal facility, which has not been practical in former machines.

12 represents a treadle pivoted between its ends to the rear side of the standard 1.

13 represents a rod screw-threaded at each end, the lower end taking into a screw-threaded socket, pivoted to the rear end of the lever 12. The upper end of the rod 13 takes into a screw-threaded socket 15, the upper end of said socket being pivoted to a plunger 16, arranged in a box 17 at the rear end of the machine, (Figs. 3 and 5), the said plunger being adapted to engage the mechanism supporting the toe wipers to raise and lower said wipers, as is common in bed lasting machines, and requires no further description, as it forms no part of my invention.

20 (Fig. 1), represents a jack post, 21 represents a jack spindle, 22 represents a last carried by the jack spindle, as is usual. At the right of the last 22 in Fig. 1, is mechanism which I have designated by the symbol 23, which embraces means for operating the wiper plates for the heel end of the shoe. This may be of any ordinary or preferred construction, as is common, and requires no detailed description as it forms no part of my invention.

Referring to the toe end of the machine, or the lefthand end shown in Fig. 1, and to Figs. 1, 3 and 5, the toe piece 13 is shown at the right side of the figure, supported by a thumb-screw 24, the milled edge of which rests on a support 25, carried by a stem 26, which is adapted to be engaged by lever mechanism not shown, for raising and lowering the toe piece 13, as is common, the screw 24 serving to adjust the toe piece to different sizes of shoes or thicknesses of toes. The upper end of the plunger 16, above the sides of the box 17 (Fig. 5) is formed with an ear 26 on each side. Springs 27 are arranged in complemental sockets in the sides of the box 17, and the ears 26, in order to prevent the shock which would take place if the ears 26 directly engaged the top of the box 17.

30 (Fig. 5) represents a slide arranged on the upper end of the plunger 16, the slide and plunger being formed with complemental dove-tail members to permit the slide to move over the end of the plunger and maintain said parts together. The upper end of the head of the plunger 16 is formed with a recess 37 (Figs. 3 and 4) in which is arranged a spur gear 38. A hand wheel 39 is connected to a short shaft 40, the latter being arranged in bearings of the walls of the plunger 16, and the spur gear 38 being rigidly secured to said shaft.

42 represents a rack secured to the lower side of the slide 30, with its teeth arranged to be engaged by the teeth of the spur gear 40. By turning the hand wheel 39, the rack 42 and also the slide 30 can be moved to the right or left in Fig. 3, or forward and back, in Fig. 5, the head of the milled nut 24 sliding on the support 25 in such operation of the machine.

The front end of the slide 30, or the righthand end in Figs. 1 and 3, is formed on either side with an upwardly projecting arm 43. To each of said arms 43 is pivoted an arm 44, connected to and carrying a ring 46 (Fig. 3).

47 represents a ring arranged inside the ring 46 and formed at its upper end with a flange 48, resting on top of the ring 46 and preventing the downward movement of the ring 47 through the ring 46.

49 represents a plate secured to the under side of the ring 47, the edge of the plate 49 projecting over and engaging the under side of the ring 46. The flange 48 and the ring 49 secure the ring 47 on the ring 46 and prevent movement of one with relation to the other in a vertical direction, but permit the ring 47 to be turned freely in the ring 46.

The top of the ring 48 is cored out to receive the shank 50 of a spider (see Fig. 4) made up of said shank and two bed plates 51, 52. The casting 53 is arranged on top of the shank 50, the said shank 50 with the plate beds 51, 52, being free to turn in the bearing formed by the ring 48 and the casting 53, but being restrained by said parts from endwise movement. The casting 53, by means of the bolts 109 is securely fastened to the ring 47. The toe wiper bed plates 51, 52, are substantially duplicates of each other. Instead of the shank 50 being provided with two of such bed plates, it may be provided with any number. As shown, the bed plates 51, 52, are formed with slots 56 adapted to receive complemental members on the under side of the toe wiper plates, as is usual. Each of said wiper bed plates 51, 52, is equipped with any desired style or size of toe wiper plates, 54, 55, (see Fig. 3). The bed plates 51, 52, are further provided between the slots 56 with seats 58, 59, the seat 59 being adapted to receive the base 60 of a stud 61, while the seat 58 receives the base 62 of a stud 63 (see Fig. 3). The base of the stud 60 is formed with a projection 64 arranged in a recess 65 of the right hand end of the shank 50, in Fig. 4. The base 62 of the stud 63 is formed with a similar projection 66 adapted to take into a recess 67 (see Fig. 3) corresponding to the recess 65, but not shown, in Fig. 4, as it is on the left hand end of the shank 50. The projections 64, 66 assist in the free movement of the studs 61, 63 by preventing the tipping or clamping of the studs 61, 63, as they are operated by means hereinafter described. The casting 53 (see Figs. 3 and 7) is formed with an upwardly projecting flange 68, shaped to form two communicating circular chambers 69, 70, open at the top. The casting 53 is also formed with a hollow hub 71, projecting up from the middle of the chamber 69.

72 represents a spur gear arranged in the chamber 70 (see Fig. 5).

73 represents the upper end of a short shaft upon which is rigidly mounted the spur gear 72. This shaft, midway its ends, is formed with a worm 74, adapted to engage a worm gear 75, secured to the hub 50 in the recess 76, (Figs. 4 and 5) by means of screws 77. It will be seen that the worm gear 75 is secured to the hub on one side of the latter and between the ends of the opening 78 in said hub, the worm gear 75 being a segment and occupying only a portion of the periphery of the hub 50.

79 represents a flat ring having a milled edge and constituting a hand wheel, said ring being arranged on the top of the flange 68. To the inside of said ring, by means of a spline or key 80, is secured a flange 81 of a spur gear 82 that meshes with the pinion 72 on the shaft 73.

101 represents a nut engaging screw-threads 102 on the end of the hub 71 and clamping on the top of the hand wheel 79 to maintain the latter in position. By turning the hand wheel 79 the pinion 72 of the shaft 73 can be rotated, and by means of the worm 74, the segmental worm gear 75, the hub 50 with its bed plates 51, 52, and the plates 54, 55, can be turned on a line running through the chambers 65, 67 as an axis, the hub 50 during such motion turning in the bearings formed by the casting 53 and the top of the ring 47.

Referring to Figs. 3 and 5, the top of the slide 30, near the inner end of the latter, is formed with a lug 83. 84 represents a lug formed with two ears 87, 88, that are pivoted by means of a pin 85 to the lug 83. 86 represents a rod, the lower end of which by means of nuts 89 and 90, is secured to the lug 84, the nut 90 secured to the lower end of the rod prevents the rod from being pulled out of the lug 84, but permits the rod to turn the nut 89 of the rod and engaging the top of the lug 84 prevents the rod from being pulled down through the lug, but does not interfere with the turning of the rod, the nuts 89 and 90 maintaining the end of the rod in position in the lug 84 but permitting the rod to be turned. This rod is arranged in the vertical hole 78 of the hub 50. The upper end of the rod 86 is formed with a screw-threaded reduced portion 92, terminating in a couple of wings 93, 94, projecting from either side of the reduced screw-threaded portion 92, the lower end of the reduced portion not occupied by said wings constituting a shoulder. 95 represents a disk having a milled edge formed with a circular opening 96 having two lateral recesses 97, 98 (Fig. 6). The opening 96 receives the reduced end 92 of the rod 86, the wing 93 taking into the recess 98, the wing 94 taking into the recess 97, the under side of said disk 95 resting on the shoulder of the rod 86. 99 represents a nut arranged on the screw-threaded portion 92 of the rod 86, adapted to clamp the disk 95 against the shoulder. By turning the hand wheel 95 the rod 86 can be turned in either direction. As shown, the rod 86 extends up through the hole 78 of the hub 50 and through the hole 99 of the hub 71 (see Figs. 7 and 3). The disk 95 (Fig. 3) is formed on its under side with a downwardly projecting circular flange 100 forming a chamber. 103 represents a ring resting on the end of the screw-threaded portion of the hub 71, and formed with an upwardly projecting circular flange 104 constituting a chamber. 105 represents a coiled spring, arranged around the rod 86 and in the chambers formed by the flanges 100, 104, thus permitting a certain movement of the rod with relation to the other mechanism, to compensate for changes of angle due to the movement given to the spider, shown in Fig. 4, and the parts carried thereby, whether said movement be the turning of the said spider, or the tipping of the said spider. In the hole 99 (see Figs. 3, 5, and 7) is arranged a nut 106 on the rod 86. 107, 108 represent two screws arranged in suitable apertures in the hub 71, at opposite sides of the latter, and adapted to take into opposite sides of the nut 106 to hold the latter stationary, these screws being connected to the nut 106 before the hand wheel 79 and the flange 81 are put in place.

In the described construction, the turning of the hand wheel 95, the nut 106 being stationary and rigidly connected to the hub 71, causes the parts supported by the arm 44 (see Fig. 3) to be raised or lowered, the parts moving in the arc of a circle, the center of which is the pivot of the arm 44. This gives in effect a tilting movement to the toe wipers.

Referring to Figs. 2, 3, and 5, the ring 46 on the left hand side of the machine (see Fig. 2) is formed with a projecting hub 120 recessed to receive a pin 36. The ring 47 is formed with recesses 121 corresponding to the number of sets of the wiper plates, to receive the end of the pin 36 and thus lock the two rings together at the proper point to position a desired set of toe wiper plates in operative position. The pin 36 beyond the hub 120 is formed with a reduced portion 122, terminating in a head 35, heretofore referred to. 124 represents a hollow nipple, screwed into the hub 120, the opening in the nipple 124 registering with the opening in the hub 120. 125 represents a perforated cap arranged upon the outer end of the nipple 124. As shown, the reduced portion of the pin 36 is arranged in the nipple 124. 126 represents a coiled spring arranged in the chamber of the nipple 124 about the reduced portion of the pin 36, one end of the spring engaging the cap 125, the other end of the spring engaging the shoulder of the hub 120, the spring tending to throw the pin inward and maintaining the pin in its inner position with the inner end of the pin of one of the recesses 121. 31 represents a bracket secured by a nut 32 to the bed plate 9. This bracket is formed with an upwardly projecting arm 33. The vertical arm 33 is formed at its upper end with an inclined or cam member 34, adapted to engage the head 35 of a pin 36, for purposes hereinafter described.

When it is desired to use a set of wiper plates not in position for engaging the toe of the last, by depressing the treadle 12 and thus elevating the mechanism controlled by said treadle, the head 35 of the pin 36 is brought into engagement with the incline 34 (Fig. 5) which pulls the pin out of the recess 121, thus unlocking the ring 47 from the ring 46 and permitting the rotation of the ring 47 in the ring 46, and the rotation of the spider about the rod 86 (Fig. 3) until the desired set of toe pieces has been brought to the front, then by releasing the treadle, the end of the pin 36 will enter an appropriate recess 121 in the ring 47 and lock the parts in the new position.

By lasting, as used in this specification and claims, I mean a shaping of the upper about the foot form, and do not include the subsequent tacking or securing of the edges of the shaped upper to the foot form.

In the operation of a machine constructed in accordance with my invention the jacking and adjusting of the shoe and the manipulation of the wipers for drawing the upper about the foot form, both at the heel and toe part, are substantially the same as those that have been followed in prior machines. In my machine, however, the operator is enabled to adjust the mechanism at an incline and also t a height convenient for said operator. This presents the foot form and the upper on all sides to the convenient and ready access of the operator. When for any reason it is desired to use a different set of toe plate wipers the treadle is depressed, thereby releasing the lock from the ring 47 and permitting the revolving of the toe plate mechanism until the proper set of toe plates is in operative position. Thereupon the treadle is released and the locking pin again locks the rings 47 and 46 together. There will be a handle 150 for each set of toe wipers and link and lever connections, 151, 152, 153, (Fig. 9) between each handle and its corresponding toe wipers. The operation of the handle and wipers is like that in the ordinary machine and requires no detailed description.

Having thus explained the nature of my invention and described a way of constructing and using the same, though without attempting to set forth all of the forms in which it may be made, or all of the modes of its use, what I claim and desire to secure by Letters Patent is:—

1. In a bed-lasting machine, a boot or shoe support, heel-lasting mechanism arranged upon one side of said support, a revolving head or part arranged on the other side of said support, and a plurality of sets of toe-wiper plates carried thereby, whereby the heel and toe-part of the shoe may be wiped down without moving the boot or shoe.

2. In a bed-lasting machine, a boot or shoe support, heel-lasting mechanism arranged on one side of said support, a movable member or part arranged on the other side of said support, a plurality of sets of toe-wiper plates carried by said member, whereby the heel and toe part of the boot or shoe may be wiped down without moving the boot or shoe.

3. In a bed-lasting machine, means for lasting the heel part of a boot or shoe, a plurality of sets of toe-wiper plates arranged to permit the movement of any one of said plates into and out of operative position, a boot or shoe support arranged between the heel-lasting means and the toe-wiper plates, whereby the heel and toe of the boot or shoe may be wiped down without moving the boot or shoe.

4. In a bed-lasting machine, means for lasting the heel part of a boot or shoe, a revoluble ring, a pivoted lever supporting said ring, a spider comprising a cylindrical hub formed with two or more toe-plate wiper beds, said hub being arranged in a complemental recess or bearing in said ring, a cap arranged over the top of said hub and secured to said ring, said hub being formed with a vertical aperture and registering with a like aperture in the cap, a rod arranged in said aperture, the lower end of which is rotatably connected with said lever, a worm segment connected with said hub, said cap being formed with upwardly projecting walls forming gear cases, a hand wheel mounted on top of said cap, worm and gear connections between said worm segment and said hand wheel housed in said chambers, whereby the operation of said hand wheel oscillates said hub and its bed plates.

5. In a bed-lasting machine, means for lasting the heel part of a boot or shoe, a revoluble ring, a pivoted lever supporting said ring, a spider comprising a cylindrical hub formed with two or more toe-plate wiper beds, said hub being arranged in a complemental recess or bearing in said ring, a cap arranged over the top of said hub and secured to said ring, said hub being formed with a vertical aperture and registering with a like aperture in the cap, a rod arranged in said aperture, the lower end of which is rotatably connected with said lever, a worm segment connected with said hub, said cap being formed with upwardly projecting walls forming gear cases, a hand wheel mounted on top of said cap, worm and gear connections between said worm segment and said hand wheel housed in said chambers, whereby the operation of said hand wheel oscillates said hub and its bed plates, a swiveled nut carried in the chamber of said cap, engaging screw-threads on said rod, means for turning said rod for tilting the toe-plate beds and the parts carried thereby.

In testimony whereof, I have affixed my signature, in presence of two witnesses.

FRANK HOLBROOK.

Witnesses:
JOHN J. DONLON,
W. H. BRESNAHAN.